United States Patent
Chong et al.

(10) Patent No.: US 10,185,035 B2
(45) Date of Patent: Jan. 22, 2019

(54) SATELLITE-BASED POSITIONING METHOD AND ASSOCIATED APPARATUS

(71) Applicant: MEDIATEK INC., Hsin-Chu (TW)

(72) Inventors: Chia-Yen Chong, Hsinchu (TW); Chih-Wei Chen, Hsinchu County (TW); Chin-Tang Weng, Hsinchu County (TW); Mu-Han Tsai, Tainan (TW)

(73) Assignee: MediaTek Inc., Hsin-Chu (TW)

( * ) Notice: Subject to any disclaimer, the term of this patent is extended or adjusted under 35 U.S.C. 154(b) by 288 days.

(21) Appl. No.: 14/585,203

(22) Filed: Dec. 30, 2014

(65) Prior Publication Data

US 2016/0187488 A1   Jun. 30, 2016

(51) Int. Cl.
| *G01S 19/25* | (2010.01) |
| *G01S 19/27* | (2010.01) |
| *G01S 19/42* | (2010.01) |

(52) U.S. Cl.
CPC .............. *G01S 19/25* (2013.01); *G01S 19/27* (2013.01); *G01S 19/42* (2013.01)

(58) Field of Classification Search
CPC .......... G01S 19/25; G01S 19/27; G01S 19/42; G01S 19/23; G01S 1/00; G01S 19/47; G01S 19/49; G01S 19/45; G01S 1/02; G01S 19/05; G01S 5/0036; G01S 19/02; G01C 21/00; G01C 21/16; G01C 21/165
USPC .................................................... 342/357.64
See application file for complete search history.

(56) References Cited

U.S. PATENT DOCUMENTS

| | | | | |
|---|---|---|---|---|
| 8,212,719 | B2 * | 7/2012 | Van Diggelen | G01S 19/05 342/357.42 |
| 8,368,588 | B2 * | 2/2013 | Weng | G01S 19/27 342/357.25 |
| 8,514,128 | B2 * | 8/2013 | McBurney | G01S 19/27 342/357.66 |
| 8,614,641 | B2 * | 12/2013 | Yule | G01S 5/0036 342/357.28 |
| 8,825,236 | B2 * | 9/2014 | Tomita | G01S 19/27 244/158.4 |
| 8,971,797 | B2 * | 3/2015 | Sheynblat | G01S 5/0036 342/357.39 |
| 9,074,897 | B2 * | 7/2015 | Kulik | G01C 21/165 |
| 9,231,690 | B2 * | 1/2016 | Hoang | H04B 7/18513 |

(Continued)

FOREIGN PATENT DOCUMENTS

| | | | | |
|---|---|---|---|---|
| EP | 2887098 A1 * | 6/2015 | | G01S 5/02 |
| JP | 2015021900 A * | 2/2015 | | |
| JP | 2015021900 A * | 2/2015 | | G01S 19/27 |

*Primary Examiner* — Bernarr E Gregory
*Assistant Examiner* — Nuzhat Pervin
(74) *Attorney, Agent, or Firm* — Wolf, Greenfield & Sacks, P.C.

(57) ABSTRACT

A satellite-based positioning method includes: obtaining predicted satellite data for at least one satellite vehicles (SVs) in a global navigation satellite system (GNSS); obtaining reference satellite data for the at least one SV; calculating satellite prediction error data for each of the at least one SV according to the predicted satellite data and the reference satellite data; and utilizing a processing unit to calculate a parameter for each of the at least one SV based on the satellite prediction error data. An associated satellite-based positioning apparatus is also provided.

18 Claims, 4 Drawing Sheets

(56) References Cited

U.S. PATENT DOCUMENTS

| | | | | |
|---|---|---|---|---|
| 2008/0032706 A1* | 2/2008 | Sheynblat | ............ | G01S 5/0036 455/456.1 |
| 2010/0103041 A1* | 4/2010 | Tomita | ................... | G01S 19/27 342/357.66 |
| 2012/0306689 A1* | 12/2012 | Yule | ..................... | G01S 5/0036 342/357.25 |

\* cited by examiner

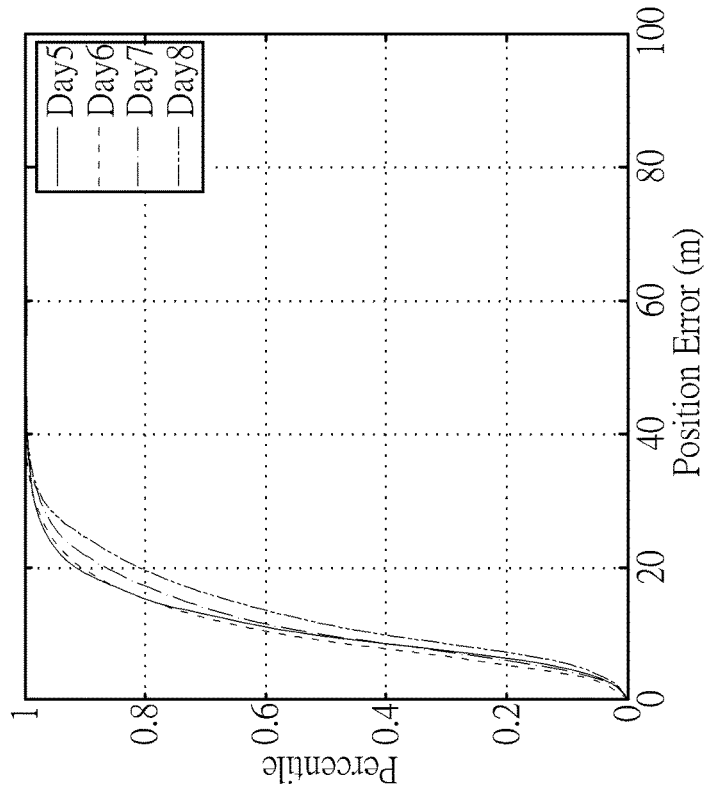
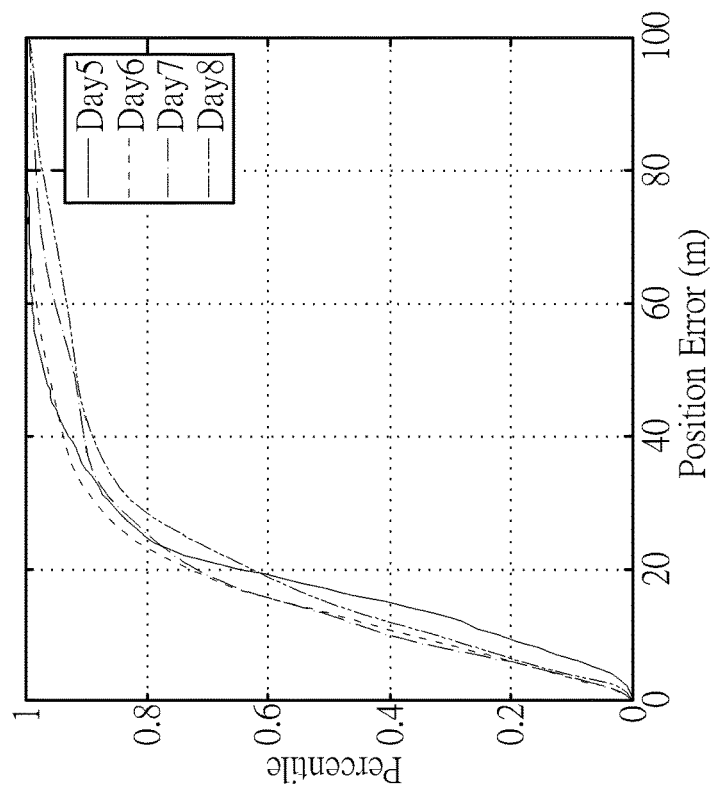
FIG. 2B
FIG. 2A
RELATED ART

SATELLITE-BASED POSITIONING METHOD AND ASSOCIATED APPARATUS

BACKGROUND

The disclosed embodiments of the present invention relate to satellite positioning, and more particularly, to a satellite-based positioning method and an associated apparatus.

A Global Navigation Satellite System (GNSS) receiver determines its position by computing arrival times of signals transmitted simultaneously from multiple satellites. Current fully-operational GNSS include the US GPS (Global Positioning System) and the Russian GLONASS (GLObalnaja NAvigatsionnaja Sputnikovaja Sistema). As part of their messages, these satellites transmit both satellite positioning data and satellite clock timing data. The satellite positions and clock timing are represented by almanac or ephemeris data, wherein the ephemeris data provides an extremely accurate estimate (~1 meter error) of satellite positions and clock bias. The process of searching for and acquiring satellite signals, reading the ephemeris data transmitted by the satellites, and computing the location of the receiver from this data is time consuming, however, often requiring several minutes. In many cases, this lengthy processing time is unacceptable and furthermore, greatly limits battery life in miniaturized portable applications.

For example, a GNSS receiver determines position based on the measurement of the arrival times at a GNSS receiver antenna of the GNSS signals broadcast from orbiting satellites. As stated, one disadvantage of such a system is the relatively long time needed to perform signal acquisition under certain conditions. Satellite signals cannot be tracked until they have first been located by searching in a two-dimensional search "space", whose dimensions are code-phase delay and observed Doppler frequency shift. The process of the GNSS receiver searching for, acquiring, and demodulating satellite signals is sometimes referred to as a "standalone" mode of operation, which can be contrasted with an "assisted" mode of operation.

In order to reduce the delay associated with a stand-alone mode of operation, information may be provided to aid a GNSS receiver in acquiring a particular signal. Such assistance information permits a receiver to narrow the search space that must be searched in order to locate a signal, by providing bounds on the code and frequency dimensions. A system that employs a GPS receiver augmented with externally sourced GPS assistance data is commonly referred to as an "assisted global positioning system" (AGPS).

AGPS is a system that predicts satellite orbit information and, in many cases, greatly improves the startup performance or time-to-first-fix (TTFF) of a GNSS satellite-based positioning system. Extended Prediction Orbit (EPO) is a prior art example of an AGPS with off-line server based AGPS technology, which is a swift way to obtain specific information of the satellite, such as position and clock, before the receiving of broadcast ephemeris. The specific information aids the GNSS positioning engine (PE) to quickly locate the satellite, and thus obtain a First Fix with a faster speed. Refer to US Patent No. 20110273329 for more details.

EPO supports up to 30 days satellite trajectory prediction using numerical fitting analysis with some models (mathematical, force, etc.), and greatly enhances a user experience by improving TTFF of a GNSS receiver. While providing a prediction of the extended satellite orbit and clock up to many days ahead, however, errors between the predicted and the actual orbit with respect to some satellites may be enormous. The First Fix may be poor since the GNSS PE cannot foretell quality of the orbit and clock prediction for respective satellites in advance.

Therefore, a novel satellite positioning method is desired for aiding a GNSS receiver to derive a First Fix.

SUMMARY

One of the objectives of the present invention is to provide a satellite-based positioning method for aiding a GNSS receiver to derive a First Fix, and an apparatus utilizing the same.

According to a first aspect of the present invention, a satellite-based positioning method is disclosed. The satellite-based positioning method comprises: obtaining predicted satellite data for at least one satellite vehicle (SV) in a global navigation satellite system (GNSS); obtaining reference satellite data for the at least one SV; deriving calculating satellite prediction error data for each of the at least one SV according to the predicted satellite data and the reference satellite data; and utilizing a processing unit to calculate a parameter for each of the at least one SV based on the satellite prediction error data.

According to a second aspect of the present invention, a satellite-based positioning apparatus is disclosed. The satellite-based positioning apparatus comprises a prediction unit and a processing unit. The prediction unit is arranged for generating predicted satellite data for at least one satellite vehicles (SVs) in a global navigation satellite system (GNSS). The processing unit is arranged for calculating satellite prediction error data for the at least one SV according to the predicted satellite data and the reference satellite data, and calculating a parameter for each of the at least one SV based on the satellite prediction error data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2A is a diagram illustrating errors of First Fixes derived by a conventional approach.

FIG. 2B is a diagram illustrating errors of First Fixes derived by the present approach.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
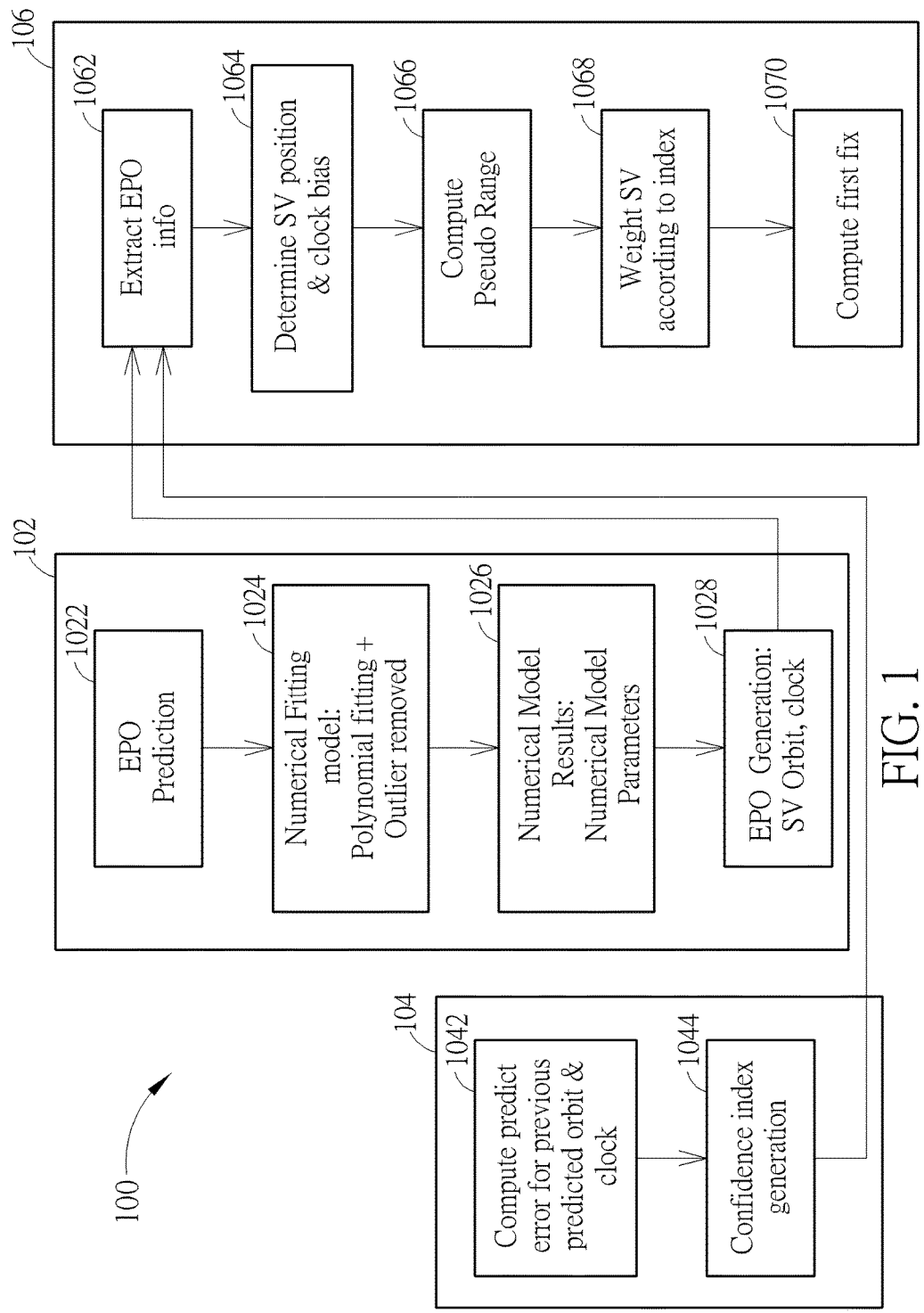
FIG. 1 is a flowchart illustrating a First Fix generation method applicable to a GNSS receiver according to an embodiment of the present invention.

FIG. 1 is a flowchart illustrating a First Fix generation method applicable to a GNSS receiver according to an embodiment of the present invention. Provided that substantially the same result is achieved, the steps of the flowchart shown in FIG. 1 need not be in the exact order shown and need not be contiguous; that is, other steps can be intermediate. Some steps in FIG. 1 may be omitted according to various embodiments or requirements. Flow 102 is a conventional EPO method. Orbits and clocks of satellite vehicles (SVs) can be predicted by the flow 102 based on a prediction source. The prediction source directs to [the International GNSS Service] (IGS) in the embodiment, but this is not a limitation of the invention. In detail, initial data obtained from the EPO prediction (1022) is utilized for numerical fitting modeling (1024), and numerical model parameters (1026). The numerical model parameters are subsequently referenced by a [central ephemeris prediction machine] to produce predictions of the orbit and clock of each SV (1028). It should be noted that the flow 102 is not limited to the EPO method as described, and may be replaced by any other mechanism that achieves the same objective. Specifically, the flow 102 may be implemented by any other orbit/clock prediction method capable of providing an orbit/clock prediction result many days in advance.

Flow 104 is a process to generate at least a confidence index. In 1044, the confidence index is produced based on prediction errors generated by 1042. The prediction errors represent how much the prediction results deviate from the actual orbits and clocks. Specifically, each SV may have a plurality of confidence index sets, which will be described later. By incorporating the confidence index sets obtained by the flow 104 (represented by the dotted line) into the orbit/clock prediction result produced by the flow 102, the GNSS receiver can derive a weight of respective SV (1068). Please note that the processes 1062, 1064, 1066, and 1070 may be replaced by any other First Fix computation mechanism to achieve the same objective. Compared with a conventional flow (bypass 1068), the disclosed method provides a more reliable and precise First Fix by referring to the weight of respective SV while the GNSS receiver computes for the First Fix. This is the spirit of the invention.

FIG. 2A and FIG. 2B are diagrams illustrating positioning errors of First Fixes derived by different approaches. FIG. 2A stands for performance of the conventional First Fix calculation approach represented by percentile vs. positioning error in meters. FIG. 2B stands for performance of the disclosed approach represented by the same format. In FIG. 2A and FIG. 2B, First Fixes are derived by referring to satellite information (satellite orbit data and/or satellite clock data) predicted at 5-8 days ago, and errors of the results are shown in the curve diagrams. As described above, the conventional approach cannot determine the quality of respective SVs. In contrast, the disclosed approach is capable of selecting the best weighted SVs with the best statistical performances. FIG. 2B is enhanced from approximately 82% to 97% compared with FIG. 2A as the positioning error is 30 m.

Figure 3:
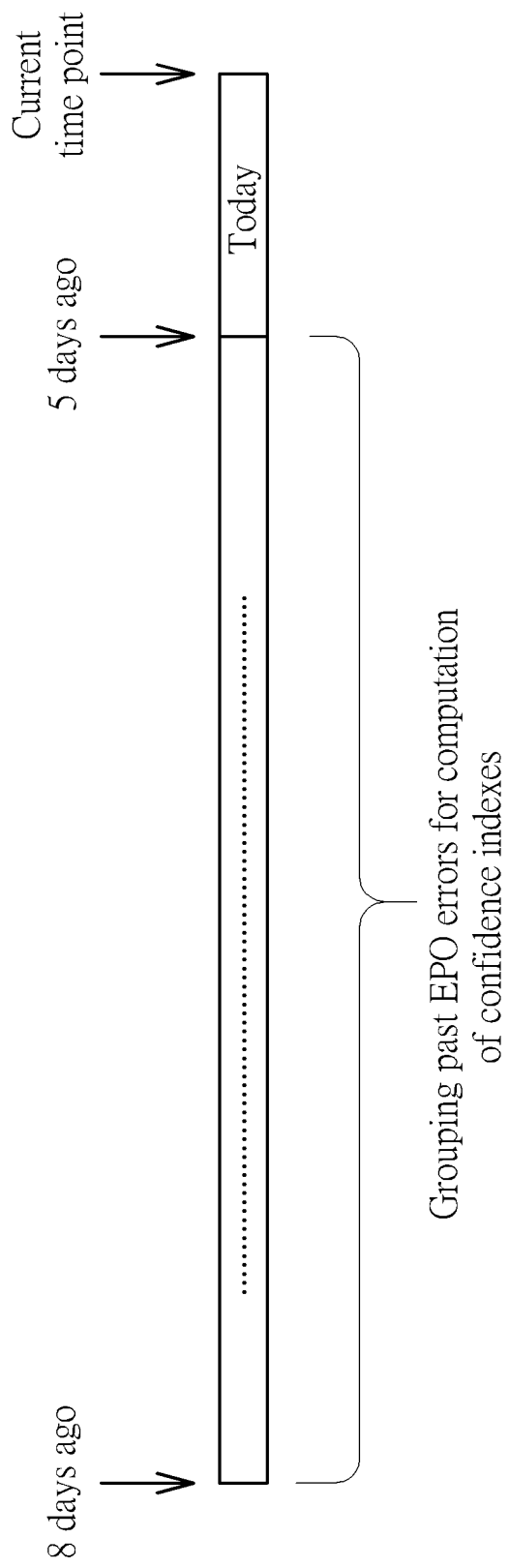
FIG. 3 is a diagram illustrating the concept of generation of confidence indexes.
Figure 4:
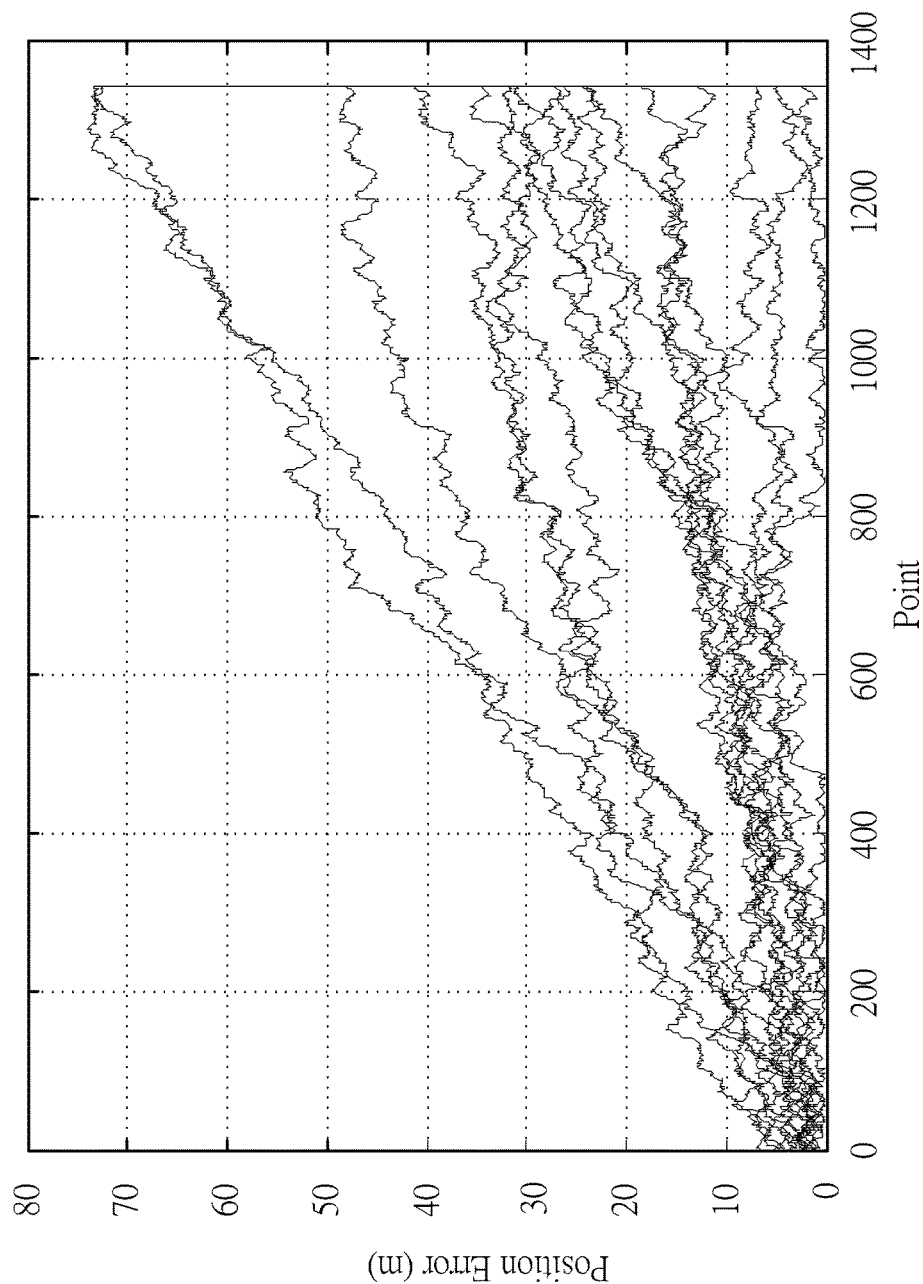
FIG. 4 is a diagram illustrating the groups of computed errors from past EPO for an SV.

FIG. 3 is a diagram illustrating the concept of generation of confidence indexes. The basic concept to generate the confidence index is to group the errors from past information provided by the EPO. The invention is not limited to a specific grouping pattern. A more detailed descriptions regarding grouping errors will be shown in FIG. 4. FIG. 4 is a diagram illustrating the groups of computed errors from past EPO for an SV. To a certain extent, FIG. 4 reveals prediction of EPO error trend for a satellite. From the distribution of the error trend, the EPO prediction quality for each of the satellite can be computed. Various analyses can also be performed on the data of FIG. 4 to obtain confidence indexes with a desired format. The confidence index is a dimensionless index which to predict the accuracy of the EPO. Please note that the clock prediction errors may also be used to make a similar diagram as FIG. 4 for analysis. In other words, the confidence index may include derived information based on either or both of the orbit prediction errors and the clock prediction errors.

The confidence index may be incorporated into the conventional EPO file, or into other types of orbit/clock prediction file. The PE therefore may check the confidence index and appropriately weight a respective SV according to the confidence index, as mentioned in FIG. 1. The SVs may then be arranged by weight, so that each SV has a priority when referenced for computing a First Fix. In this way, a more reliable and precise First Fix may be obtained based on the SVs with higher priorities.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A satellite-based positioning method comprising:
  by a global navigation satellite system (GNSS) receiver:
    obtaining predicted satellite data for at least one satellite vehicle (SV) in a GNSS;
    obtaining reference satellite data for the at least one SV;
    calculating satellite prediction error data for each SV according to the predicted satellite data and the reference satellite data;
    calculating a confidence index for each SV based on the satellite prediction error data;
    weighting each SV according to the confidence index to give each SV a weight; and
    calculating a First Fix of the GNSS receiver according to the predicted satellite data at least by prioritizing SVs with higher weights over SVs with lower weights.

2. The method of claim 1, wherein the predicted satellite data, the satellite prediction error data, and the reference satellite data are associated with satellite orbit data.

3. The method of claim 1, wherein the predicted satellite data, the satellite prediction error data, and the reference satellite data are associated with satellite clock data.

4. The method of claim 1, wherein the predicted satellite data for the at least one SV is generated by an extended prediction orbit (EPO) process.

5. The method of claim 1, wherein obtaining the predicted satellite data for the at least one SV comprises:
  obtaining a first predicted satellite data set which predicts satellite data of a first time point for each SV, wherein the first predicted satellite data set is made at time points between the first time point and a second time point, and wherein the first time point is not later than a current time point, and the second time point is earlier than the first time point.

6. The method of claim 5, wherein obtaining the reference satellite data for the at least one SV comprises:
  obtaining a reference satellite data set of the first time point for the at least one SV.

7. The method of claim 6, wherein calculating the satellite prediction error data for each SV according to the predicted satellite data and the reference satellite data comprises:
calculating a satellite prediction error data set for each SV according to a difference between the first predicted satellite data set and the reference satellite data set.

8. The method of claim 5, wherein obtaining the predicted satellite data for the at least one SV further comprises:
obtaining a second predicted satellite data set which predicts satellite data of a third time point for each SV, wherein the second predicted satellite data set is made at time points between the third time point and a fourth time point, and wherein the third time point is earlier than the first time point, and the fourth time point is earlier than the third time point.

9. The method of claim 8, wherein obtaining the reference satellite data for the at least one SV comprises:
obtaining a first reference satellite data set of the first time point for each S V; and
obtaining a second reference satellite data set of the third time point for each SV.

10. The method of claim 9, wherein calculating the satellite prediction error data for each SV according to the predicted satellite data and the reference satellite data comprises:
calculating a first satellite prediction error data set for each SV according to a difference between the first predicted satellite data set and the first reference satellite data set; and
calculating a second satellite prediction error data set for each SV according to a difference between the second predicted satellite data set and the second reference satellite data set.

11. The method of claim 1, wherein calculating the confidence index based on the satellite prediction error data comprises:
performing a statistical operation upon the satellite prediction error data to calculate the confidence index.

12. The method of claim 11, wherein the statistical operation computes for standard deviation.

13. The method of claim 11, wherein the statistical operation computes for an average value.

14. A satellite-based position apparatus, comprising:
a prediction unit configured to generate predicted satellite data for at least one satellite vehicle (SV) in a global navigation satellite system (GNSS);
a processing unit configured to:
calculate satellite prediction error data for the at least one SV according to the predicted satellite data and reference satellite data;
calculate a confidence index for each SV based on the satellite prediction error data; and
weight each SV according to the confidence index to give each SV a weight; and
a positioning engine (PE) configured to calculate a First Fix of the satellite-based positioning apparatus according to the predicted satellite data at least by prioritizing SVs with higher weights over SVs with lower weights.

15. The apparatus of claim 14, wherein the predicted satellite data, the satellite prediction error data, and the reference satellite data are associated with satellite orbit data.

16. The apparatus of claim 14, wherein the predicted satellite data, the satellite prediction error data, and the reference satellite data are associated with satellite clock data.

17. The apparatus of claim 14, wherein the prediction unit is an extended prediction orbit (EPO) unit.

18. The apparatus of claim 14, wherein the processing unit performs a specific statistical operation upon the satellite prediction error data to calculate the confidence index.

* * * * *

UNITED STATES PATENT AND TRADEMARK OFFICE
CERTIFICATE OF CORRECTION

PATENT NO. : 10,185,035 B2
APPLICATION NO. : 14/585203
DATED : January 22, 2019
INVENTOR(S) : Chia-Yen Chong et al.

Page 1 of 1

It is certified that error appears in the above-identified patent and that said Letters Patent is hereby corrected as shown below:

In the Claims
In Claim 9, at Column 5, Line 19, delete "S V" and replace it with -- SV --.

Signed and Sealed this
Eighteenth Day of June, 2019

Andrei Iancu
*Director of the United States Patent and Trademark Office*